Nov. 11, 1958  S. SHAPPELL  2,859,846
OVERLOAD RELIEF MECHANISM
Filed Sept. 2, 1955  2 Sheets-Sheet 1

INVENTOR:
STANLEY SHAPPELL
BY Lawrence Burns,
ATTORNEY

Nov. 11, 1958  S. SHAPPELL  2,859,846
OVERLOAD RELIEF MECHANISM
Filed Sept. 2, 1955  2 Sheets-Sheet 2
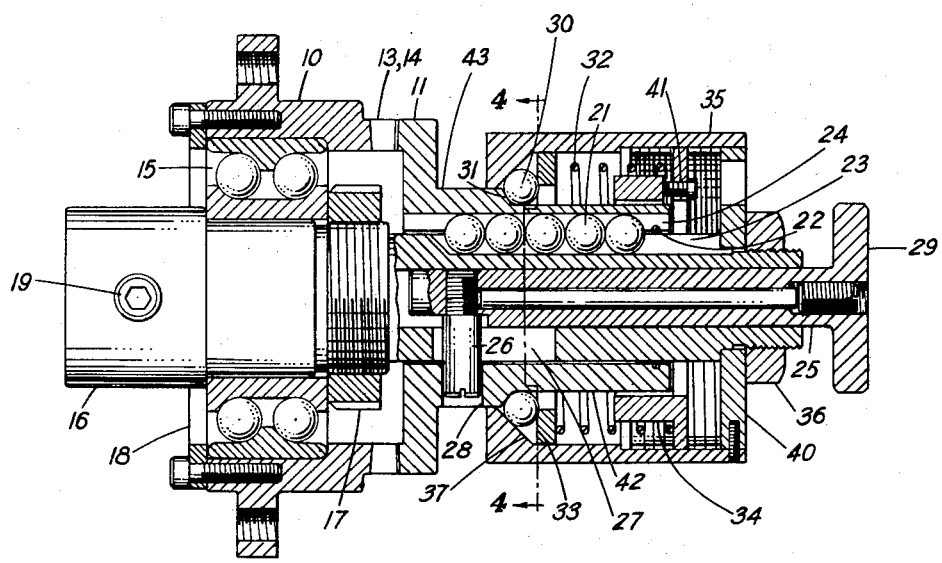
Fig. 2
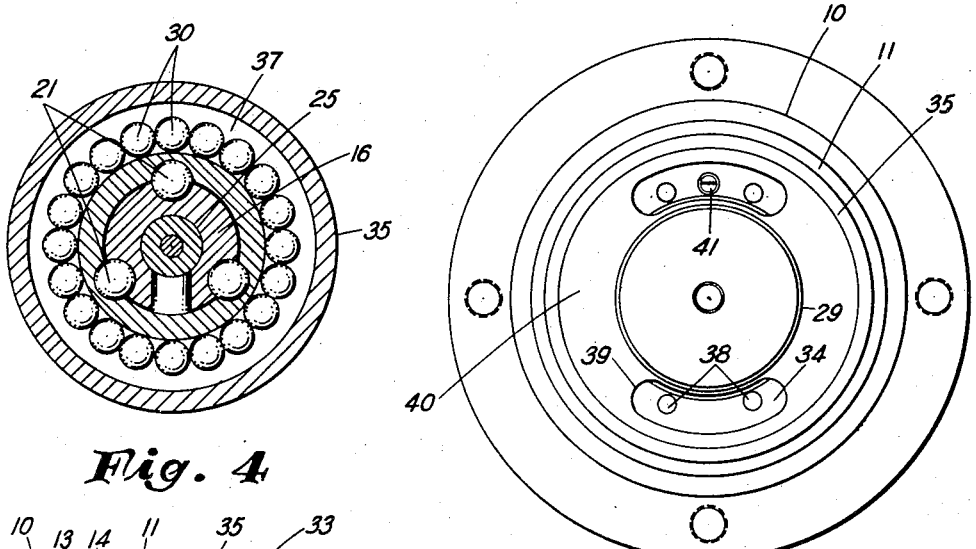
Fig. 4
Fig. 5
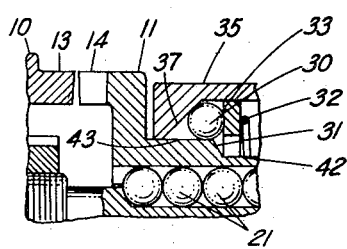
Fig. 3
INVENTOR.
STANLEY SHAPPELL
BY Lawrence Burns,
ATTORNEY

United States Patent Office 2,859,846
Patented Nov. 11, 1958

2,859,846

OVERLOAD RELIEF MECHANISM

Stanley Shappell, West Boxford, Mass., assignor to Sylvania Electric Products Inc., Salem, Mass., a corporation of Massachusetts Application September 2, 1955, Serial No. 532,276

3 Claims. (Cl. 192—56)

This invention relates generally to torque responsive overload relief mechanisms and more particularly to such mechanisms which provide positive coupling between driver and driven members until a predetermined torque limit is reached.

An object of this invention is to provide a torque limiting mechanism in which a small increment above a selected torque limit causes release of a driving coupling. Another object to effect disengagement in successive operations under uniform load conditions. A related object is the minimizing of friction as a factor effecting disengagement.

Another object is to provide a limited torque coupling which permits transmission of a starting torque in excess of the torque limit at full operating speed.

A further object of my invention is to provide a torque limiting mechanism which remains disengaged until it is reset after being "thrown out" by an overload.

Another object is to provide a torque overload relief mechanism which may be reset from a remote station after an overload occurs.

Still another object of my invention is the provision of a limited torque coupling in which the torque limit is easily variable and maintainable once adjusted.

It is yet another object to provide a torque sensitive overload relief mechanism of simple, rugged and compact design.

These and other objects and advantages of my invention will be clarified from the following detailed description of an illustrative embodiment with reference to the accompanying drawing in which:

Figure 2 is a view of the mechanism shown in longitudinal section;

Figure 3 is a fragmentary view in cross section showing the mechanism in released or inoperative position;

Figure 4 is a view in cross section taken along the line 4—4 of Figure 2;

Figure 5 is an end view of the mechanism.

Figure 1:
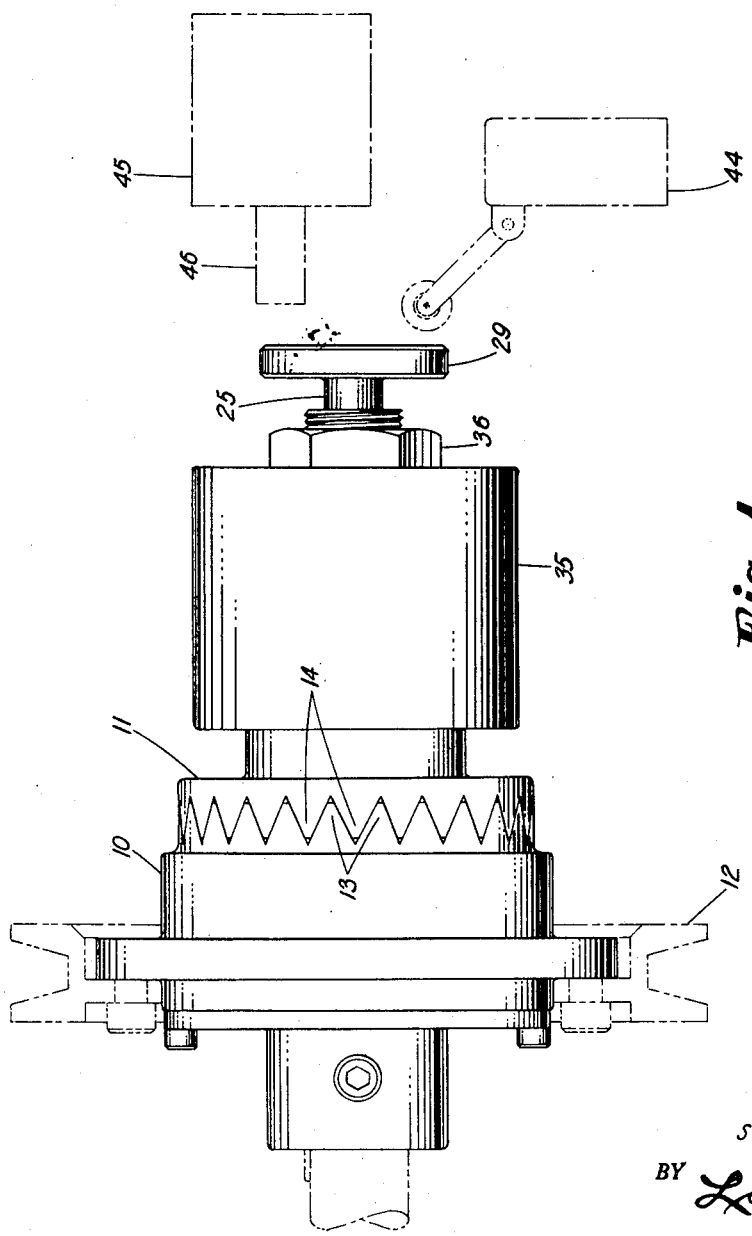
Figure 1 is a plan view of a torque sensitive overload relief mechanism constructed according to my invention.

In the embodiment of my invention illustrated in the drawings, I employ a clutch as shown in Figure 1 and comprising a driver ring 10 and a driven sleeve 11. A drive sheave 12 is mounted on the ring 10 and the clutch components 10 and 11 are provided with teeth 13 and 14 respectively. Opposite sides of adjacent teeth are inclined at an angle of approximately 60° and are adapted to transmitting a load in either direction. Teeth having a contacting surface inclined backwardly with respect to the direction of motion have a tendency to disengage under load and engagement must therefore be maintained under axial pressure. This tendency to disengage is generally proportional to the angle between the contact surface and an axial plane intersecting the surface.

The internal construction of the mechanism will now be described with particular reference to Fig. 2. The driver ring 10 is journalled on an anti-friction bearing 15 retained on a shaft 16 by a nut 17 and in the driver ring 10 by an annular retainer 18. The shaft 16 is provided with an internal socket intended to receive a driven shaft and a set screw 19 to retain the mechanism on the shaft.

In order to reduce friction as a factor in disengagement of the torque transmitting members, the sleeve 11 is reciprocably mounted on the shaft 16 on three longitudinally disposed rows of steel balls 21 retained by a wire ring 22 in ways 23 and 24 formed in the shaft 16 and the sleeve 11. A reset plunger 25 is slidable in the shaft 16 and carries near its inner end a stud 26 which extends radially through a slot 27 in the shaft 16 and a hole 28 in the sleeve 11. A head 29 integral with the plunger 25 thus moves axially outwardly when the teeth 13 and 14 are disengaged by an overload.

Under conditions of normal load the sleeve 11 is biased into engagement with the mating ring 10 by a mechanism comprising an annular row of spherical members 30 bearing against an angular abutment 31, and a spring 32 under compression between a thrust washer 33 and a limit adjusting nut 34. A housing 35 fixed to the shaft 16 by a nut 36 encompasses the biasing mechanism and includes an angular surface 37 which, in bearing on spherical members 30, translates the axial pressure of the spring 32 into a force urging said members 30 radially inwardly. This radial force is adjusted by the axial positioning of the nut 34. A spanner wrench (not shown) can be inserted into the holes 38 shown in Figure 5 through arcuate openings 39 in cover 40 to turn the nut 34 for adjusting the torque limit. A lock screw 41 is tightened after the torque limit adjustment has been made thereby slightly distorting the nut 34 to prevent its displacement in operation.

In operation, the teeth 13 and 14 are in mesh as shown in Figures 1 and 2, forming a driving connection between the ring 10 and the sleeve 11, under the bias provided by the axial pressure of the spring 32 acting through the spherical members 30. Under normal load conditions, the spherical members 30 are retained radially inwardly in contact with the sleeve 11 at a minor diameter 42 and the whole mechanism rotates as a unit. Any resistance to rotation is translated by the angular teeth 13 and 14 into an axial force component opposing the pressure of the spring 32. When the torque limit is reached, this force exceeds the spring pressure and the sleeve 11 moves to the right forcing the spherical members 30 radially outwardly out of contact with the abutment 31 and into contact with the sleeve 11 at a major diameter 43 as shown in Figure 3. The torque limit at which disengagement takes place may be altered by varying the angle of the teeth 13 and 14, by replacing the spring 32, or by changing the position of the nut 34. As the sleeve 11 moves out of engagement the head 29 of the plunger 25 moves to the right as shown in Figure 1 and may be employed to trip a switch 44 connected in series with the drive motor. In addition to shutting off the motor, the switch 44 may be connected to warn an operator by means of an alarm or signal light when an overload occurs requiring the operator's attention.

It will be appreciated that in addition to the axial force resulting from resistance of the driven member to rotation, the spherical members 30 are also urged radially outwardly by centrifugal force. Under a given set of adjustments, tests have shown a variation in the torque value which causes disengagement of the coupling at different speeds. Thus, for example, conditions which permit a running release point of 35 inch pounds at 1750 R. P. M. produce a static limit of 50 inch pounds. Since machines generally present considerably more resistance to motion on starting than they do in operation, such a difference is of value in permitting the operating torque limit to be exceeded temporarily without releasing the coupling while the machine with which the mechanism is associated reaches its full operating speed.

The outward motion of the sleeve 11 is limited as its outer end contacts the inner surface of the cover 40. Since the spherical members now are urged radially inwardly against the diameter 43 the axial pressure of the spring 32 no longer urges the sleeve 11 into coupling engagement and the mechanism must be reset by pushing the plunger 25 inwardly before operation can be resumed. A solenoid 45 having an armature 46 which may be employed to reengage the torque coupling members from one or more remote positions, is shown in Fig. 1. A normally open switch not shown is connected in series with the solenoid 45 across a source of electrical potential. To reset the mechanism the switch is closed momentarily, energizing the relay. The armature 46 moves into contact with the head 29 and pushes the plunger 25 inwardly thereby reengaging the sleeve 11 to the ring 10.

From the foregoing disclosure of a preferred embodiment of my invention, many variations will be apparent to those skilled in the art. It is not intended, therefore, that the invention be limited to the particular arrangement of parts illustrated and described but rather to depend upon the definitions of the invention contained in the appended claims.

What I claim is:

1. A torque responsive overload relief mechanism comprising a shaft; driver and driven members, one of the said members being rotatable on the said shaft and the other said member slidable axially between an engaged and a disengaged position, the slidable member being provided with a minor diameter, a major diameter and an angular abutment connecting said minor diameter to said major diameter; teeth on the said members forming a driving connection transmitting a torque load when the said slidable member is in the said engaged position; and releasable biasing means for urging the said slidable member into engagement with the said rotatable member, said biasing means including a plurality of spherical elements normally disposed on said minor diameter and spring means urging the said spherical elements radially inwardly and against the said abutment until a predetermined torque limit is reached; the said teeth translating the said torque load into an axial force component opposite in direction to the said urging means whereby the said spherical elements are displaced outwardly out of contact with the said minor diameter and the said abutment and onto the said major diameter when the torque limit is reached allowing the said slidable member to move to its disengaged position.

2. The mechanism defined in claim 1 further characterized by the said biasing means additionally comprising a sleeve, encompassing a portion of the said slidable member and carrying adjustable means for regulating the biasing pressure of the said spring means.

3. A torque responsive overload relief mechanism comprising a driven shaft; a driver ring rotatably mounted on the said shaft; a driven sleeve slidable on the said shaft, between an engaged and a disengaged position, said sleeve being provided with a minor diameter, a major diameter and an angular abutment connecting said minor diameter to said major diameter; teeth on the said ring and the said sleeve forming a driving connection transmitting a torque load when the said sleeve is in the engaged position and releasable biasing means for urging the said sleeve into its engaged position, said biasing means including a ring of spherical elements normally disposed on said minor diameter and spring means urging the said spherical elements radially inwardly and against the said abutment until a predetermined torque limit is reached, the said teeth translating the said torque load into an axial force component opposite in direction to the pressure of the said spherical elements against the said abutment whereby the said spherical elements are displaced radially outwardly out of contact with the said minor diameter and the said abutment and onto the said major diameter when the torque limit is reached thus allowing the said sleeve to move to its disengaged position.

References Cited in the file of this patent

UNITED STATES PATENTS

| 2,514,227 | Dodge | July 4, 1950 |

FOREIGN PATENTS

| 855,904 | France | Feb. 26, 1940 |
| 636,404 | Great Britain | Apr. 26, 1950 |
| 700,706 | Great Britain | Dec. 9, 1953 |